United States Patent

[11] 3,619,351

| [72] | Inventor | Frans Adam Kolosh<br>Molndal Sweden |
|---|---|---|
| [21] | Appl. No. | 795,023 |
| [22] | Filed | Jan. 29, 1969 |
| [45] | Patented | Nov. 9, 1971 |
| [73] | Assignee | Mo och Domsjo Aktiebolag<br>Ornskoldsvik, Sweden |
| [32] | Priority | Jan. 30, 1968 |
| [33] | | Sweden |
| [31] | | 1239/68 |

[54] PROCESS AND COMPOSITION FOR CONTROL OF RESIN IN CELLULOSE PULP SUSPENSIONS
14 Claims, No Drawings

[52] U.S. Cl. .................................................. 162/72, 162/76, 162/DIG. 4

[51] Int. Cl. ..................................................... D21c 3/20
[50] Field of Search ......................................... 162/72, 76, 158, 70, DIG. 4; 252/357, 358; 260/567.6, 501.15

[56] References Cited
FOREIGN PATENTS
566,988  12/1958  Canada .................... 162/DIG. 4

Primary Examiner—S. Leon Bashore
Assistant Examiner—Arthur L. Corbin
Attorney—Janes & Chapman

ABSTRACT: Process and composition for controlling resin in aqueous cellulose pulp suspensions which comprises incorporating in the suspension a resin control agent comprising a water-soluble nonsurface-active cationic quaternary ammonium salt.

PROCESS AND COMPOSITION FOR CONTROL OF RESIN IN CELLULOSE PULP SUSPENSIONS

This invention relates to resin control agents which are nonsurface-active quaternary ammonium salts, and to a process for preventing the agglomeration and/or deposition or resin particles in cellulose pulp suspensions by use of such nonsurface-active quaternary ammonium salts.

Cellulose pulp contains a considerable proportion of organosoluble matter which is generally referred to as resin or pitch. These resins are rather complex chemical substances, whose structure and origin are not fully known. Resins are probably formed at least in part in the chemical reactions accompanying the chemical treatment of the wood, preceding the formation of cellulose pulp. The resins are extracted from the wood in the pulping process, and constitute a considerable nuisance in cellulose suspensions because the resin particles are sticky, tend to agglomerate and form adherent deposits on the pulping and papermaking machinery, such as in metering screws, towers, beaters, grinders, Fourdrinier wires, screens and filters.

If the resins deposit on the machinery, they can cause clogging of small openings such as on filters, screen and wires, and they can also obstruct the proper operation of moving metal parts. The deposits which accumulate can suddenly be released, resulting in sudden and excessive contamination of the pulp with undissolved lumps of resin, and undissolved resin lumps can result in the form of resin spots in the paper. Naturally, these difficulties have led to a considerable effort to control the deposition of resin in cellulose pulp suspensions.

It is possible, of course, to reduce the difficulties arising from resin by using well-seasoned wood. Evidently, the wood extractives leading to the formation of resin tend to change character on storage, possibly due to oxidation, and have a lesser tendency to be converted into resin. The cooking process also has an effect on the resin content and character of the pulp. Sulfite mills in particular have a serious problem with both softwoods and hardwoods, because in the acid cook the fatty and resin acids are not converted into hydrophilic soaps, as in the alkaline pulping processes, and a considerable amount of resin can be dispersed in the cooking liquor. A further difficulty can arise in bleaching, because chlorination of the resin can add considerably to the tackiness of the resin, especially in the case of hardwood pulps.

In order to prevent the deposition of resin which is not well dispersed or dissolved in the pulp, it has been suggested that surface-active agents such as the fatty or resin acid soaps of synthetic detergents be added to the pulping liquor or pulp suspension. Fatty acid soaps and oleic acid have been used in the alkali stage for deresination for a long time. The development of synthetic detergents led to the suggestion that Turkey red oil or sulfonated castor oil be used (Jayme, U.S. Pat. No. 2,074,473) and then nonionic surface active agents such as polyoxyethylene condensates were suggested (O'Meara and Patterson, TAPPI, 43 927 (1960), U.S Pat. No. 2,716,058 to Rapson and Wayman, and Swedish Pat. No. 150,651 to Samuelson). Nonyl phenol ethylene oxide condensates are suggested as particularly suitable. The optimum proportion of ethylene oxide varies with the molecule, but from 60 to 75 percent ethylene oxide has been suggested, detergents containing the larger proportions of ethylene oxide being more suitable for softwood pulps, and those containing a lesser proportion of ethylene oxide being more suitable for hardwood pulps. Addition of phosphate builders can also be effected, to improve the dispersing effect.

The use of surface active agents has not, however, been entirely free from difficulties. When the pulp suspension is diluted again, there is danger of reprecipitation of the resin, and the addition of more surface active agent may be necessary. Moreover, many surface active agents are sensitive to the pH of the pulping suspension. Another difficulty is that surface active agents are also good foaming agents, and the amount of foam they create may even impose a limit on the amount of surface active agent that can be tolerated in the suspension.

It has also been proposed that the resin be fixed in or on the cellulose fibers, so that it is prevented from becoming dispersed in the pulp suspension in the course of the pulping. For this purpose, cationic surface-active agents have been added, in small amounts, as suggested by British Pat. No. 769,849. These are water-soluble salts of primary, secondary or tertiary amines, usually fatty amines having one or more groups of from sixteen to eighteen carbon atoms. It is thought that the cationic surface-active agent precipitates the anionic resin on the fiber in particulate form, and in this way prevents the formation of agglomerations of resin particles in the suspension. The difficulty with this procedure, however, is that the cationic surface-active agents which are used are only weakly cationic at a pH higher than from 6 to 7, as a result of which these agents cannot be used in highly alkaline suspensions. Moreover, the effect appears to be found only within a rather narrow range of amounts, and amounts in excess of or below this range have a deleterious effect. An excess of cationic substances, for example, can positively charge the anionic resin particles, as a result of which the particles are precipitated in the form of sticky agglomerates. A further difficulty is that since the resin is not removed at all, but merely fixed on the fiber, it is present in the finished pulp, and impairs the lightness of the fibers. Moreover, these types of additives cannot be used for viscose pulps.

It has also been suggested that particulate inorganic mineral substances or fibers be added, such as talcum, or asbestos fibers. The principle here is to coat the surface of the sticky resin particles with the material, and thus prevent their agglomeration. Asbestos fibers have a positive charge, and are assumed to be attracted to the anionic resin particles, and vice versa, as a result of which the anionic particles are precipitated on the asbestos fibers. However, rather large amounts of these additives are required, from 0.5 to 2 percent by weight of the cellulose which makes their use expensive. Moreover, these substances must be added at an early stage in the pulping process, even though this appreciably lowers the retention ability of the substance for the resin. During beating, the protective layer is usually at least partially removed as the result of the shear forces, whereupon the surfaces of the resin particles are again sticky, and free to agglomerate. Furthermore, the cationic charge on the asbestos fibers is also dispelled at high pH values, so that these materials cannot be used in alkaline liquors.

In accordance with the invention, a resin control agent is provided which is water-soluble, cationic regardless of pH of the pulping suspension, and nonsurface-active. By "nonsurface active," it is meant that there is no surface activity in accordance with conventional tests. In particular, the surface tension measure at 20° C. according to the method of de Noüy, in an aqueous solution containing from 5 to 500 mg. per liter of the substance, exceeds 50 dynes/cm. In accordance with the process of the invention, the resin control agents are added to the cellulose pulp suspension at any stage of the processing, and are effective in preventing agglomeration and deposition of the resin pulp therein.

The nonsurface-active quaternary ammonium compounds employed as resin control agents in accordance with the invention are quaternary ammonium lower alkyl and/or lower alkanol and/or polyoxyalkylene alkanol salts which have the formula:

$$\left[ \begin{array}{c} R_2 \\ | \\ R_1-N-R_3 \\ | \\ R_4 \end{array} \right]^+ X^-$$

In the above formula, from one to four of $R_1$, $R_2$, $R_3$ and $R_4$ are saturated aliphatic hydrocarbon radicals having from one to about four carbon atoms; and/or from one to four of $R_1$, $R_2$, $R_3$ and $R_4$ are hydroxyalkyl or polyoxyalkylene radicals terminating in a hydroxyl group, and having a formula selected from the group consisting of $(C_2H_4O)_mH$, $(C_3H_6O)_pH$ and $(C_4H_8O)H$, wherein $m$ is an integer from one to ten, $p$ is an integer from one to five, and $q$ is an integer from one to two; and mixtures of two or more thereof. Thus, all of the R radicals are either saturated lower aliphatic hydrocarbon radicals or hydroxyalkyl or hydroxyalkylene polyoxyalkylene radicals of these types.

X is an inorganic anion, and is preferably selected from the group consisting of $HSO_4$, $CH_3SO_4$, $C_2H_5SO_4$, Cl and Br. The nature of X is not critical, provided it is inert in the cellulose pulping liquor.

It will be evident that these compounds are quaternary lower hydrocarbon amines having methyl, ethyl, propyl, isopropyl, butyl, isobutyl, sec-butyl and tert-butyl groups, in any combination of the same and different groups; quaternary alkanol amines, and quaternary hydroxyalkylene amines having polyoxyethylene, polyoxypropylene, and/or polyoxybutylene groups; or quaternary hydrocarbon alkanol amines having mixed combinations of such groups.

Exemplary quaternary ammonium compounds are tetramethyl ammonium chloride, trimethylethyl ammonium bromide, monopropyl dimethyl ethyl ammonium chloride and ammonium dibutyl methyl monomethyl sulfate.

The preferred compounds are quaternary methyl triethanolamines having the formula:

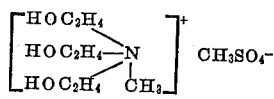

The quaternary hydrocarbon amines are known, and are available commercially. Where not available, they are readily obtainable by known methods.

The quaternary triethanolamines, tripropanol amines and tributanol amines also are known, and they and their polyoxyalkylene derivatives can be prepared in known manner by the condensation of ethylene oxide, propylene oxide or butylene oxide with ammonia or a mono, di or trialkanolamine. The reaction mixture thus can contain mixtures of mono-, di- and trialkanolamines, together with higher polyoxyalkylene derivatives. This mixture can be subjected to quaternization, but it is preferable to distill the product, so as to remove the trialkanolamine fraction in the form of a product having from 98 to 99 percent trialkanolamine. The quaternary ammonium nonsurface-active resin control agent can be prepared from the alkanolamine such as 98-99 percent triethanolamine by quaternizing with the quaternizing agent, such as dimethyl sulfate, in known manner.

The quaternary ammonium resin control agents of the invention are believed to cause the negatively-charged (anionic) resin particles to be fixed by their positive charge to the negatively-charged (anionic) cellulose fibers, thus avoiding agglomeration of the resin in the pulping suspension. This conforms with the usual behavior of cationic substances. However, the quaternary ammonium compounds of the invention also surround the resin particles, and convert their surfaces from a lipophilic to a hydrophilic condition, as the result of which a solubilization of the resin in the cellulose pulp suspension is obtained, as is usual in the case of surface-active nonionic resin dispersants. In this way, and as a result of the solubility of the quaternary ammonium compound in water, the sensitivity to overdosing associated with the use of cationic surfactants, or water-soluble salts of primary, secondary or tertiary long chain fatty amines, is avoided. The most important advantage, however, is that the quaternary ammonium compounds of the invention, since they are nonsurface-active, do not give rise to foaming, glazing, or like difficulties, nor do they result in resin precipitation when the system is diluted. Moreover, there is no period after introduction of the quaternary ammonium compound where the system is sensitive to reprecipitation of the resin.

The quaternary ammonium compounds can be added to the cellulose pulp suspension as such, without being diluted with water or other solvent. Neither are they sensitive to variations in pH of the cellulose suspension. No precipitation of the resin is noted in the beating process, since the linking between the quaternary ammonium compound and the resin takes place molecularly. Only small amounts of the quaternary ammonium compounds are required to obtain the desired effect.

Examples of suitable starting materials for quaternization to produce resin control agents in accordance with the invention are mono-, de- or trimethylamine, mono-, di- or triethylamine, mono-, di- or tripropylamine, mono-, di-or tri-isopropylamine, mono-, di- or tributylamine, mono-, di- or tri-isobutylamine, mono-, di- or tri-secbutylamine, mono-, di- or tritertbutylamine, dimethyl ethylamine, dimethyl propylamine, methylethyl propylamine, dibutyl methylamine, dibutyl ethylamine, mono-, di- or triethanolamine, mono-, di- or tripropanolamine, mono-, di- or tributanolamine, methyl diethanolamine, ethyl dipropanolamine, diethyl monobutanolamine, butyl diethanolamine, dipropyl monoethanolamine, dibutyl monopropanolamine, monoethanol monobutanol methylamine, methyl isopropyl ehtnaolamine, and isobutyl dibutanolamine, in the form of pure substances, or as technical mixtures.

Ethylene oxide and/or propylene oxide and/or butylene oxide can be condensed with the alkanol amines before quaternization.

Dimethyl sulfate is particularly suitable for use as a quaternizing agent, owing to its reactivity. Examples of other quaternizing agents are diethyl sulfate, methyl or ethyl chloride, and methyl or ethyl bromide.

The quaternary ammonium resin control agent in accordance with the invention can be added to the cellulose pulping suspension at any stage during the manufacture of the pulp and/or paper. Amounts within the range from 0.005 up to about 1 percent, based on the weight of the cellulose, are effective.

The quaternary ammonium resin control agents can be used to control resin in any type of cellulose pulp, including sulfite pulp and sulfate pulp, mechanical pulp, semichemical pulp, and chemical one-stage and multistage pulps, prepared using steam, acid sulfite, neutral sulfite, bisulfite, alkali or kraft procedures, or combinations thereof. The pulps can be prepared from bolts, chips, or other forms of wood particles, derived from both softwoods and hardwoods, and in particular, spruce, pine, fir, elder, maple, birch, hickory, beech, ash, sweet gum, sycamore, cottonwood, aspen, oak and elm.

The absence of surface active properties in the quaternary ammonium resin control agents of the invention is demonstrated by the following experiments.

EXAMPLE A

One mole of 98 percent triethanolamine was quaternized at 25–30° C. with 1 mole of dimethyl sulfate. The resulting product, quaternary ammonium methyl triethanolamine monomethyl sulfate, was a yellowish liquid, slightly viscous at room temperature. The surface activity of the product was estimated by measuring the surface tension as an aqueous solution at 20° C. in accordance with the method of de Nouy, at varying concentrations. For comparison, a mixture of $C_{16}$–$C_{18}$ fatty alcohols condensed with eighteen moles of ethylene oxide per mole of fatty alcohol was also tested. The results are shown in the following Table:

TABLE A

| Concentration, mg./l. aqueous solution | Surface tension (dynes/cm.) | |
|---|---|---|
| | Quaternary ammonium methyl triethanolamine monomethyl sulfate | Fatty alcohol-ethylene oxide adduct |
| 0 | 72 | 72 |
| 5 | 72 | 46 |
| 20 | 71 | 42 |
| 200 | 67 | 40 |
| 500 | 59 | <40 |
| 1000 | 51 | <40 |

It is evident from these results that the fatty alcohol ethylene oxide adduct is quite surface active, but the quaternary methyl triethanolamine monomethyl sulfate is not surface active, since its surface tension-reducing action is negligible.

EXAMPLE B

The absence of foam in aqueous solutions of the quaternary ammonium resin control compounds of the invention was determined using a standardized foaming test, employing the same compounds described in example A. One gram of each product was dissolved in 1 liter of distilled water. Two hundred ml. of this solution was added to a 500 ml. graduated mixing cylinder, which was placed in a rotating device which turned the mixing cylinder at a speed of 1 revolution for each 1.5 seconds. After rotation for 15 seconds, the cylinder was stopped. The height of the foam (as milliliters above the surface of the liquid in the cylinder) was read off and recorded at once, and again after 20 seconds and after 300 seconds following stopping of the cylinder. The results are shown in the following table:

TABLE B

| | Height of foam in ml. | |
|---|---|---|
| Time after stopping rotation of the cylinder (seconds) | Quaternary ammonium methyl trimethyl trimonomethyl sulfate | Fatty alcoholethylene oxide adduct |
| 0 | 10 | 90 |
| 20 | 0 | 90 |
| 300 | 0 | 70 |

It is evident from the data that the foaming action with the quaternary methyl triethanolamine monomethyl sulfate solution was negligible, and the foam formed was unstable, and rapidly collapsed. On the other hand, the fatty alchol-ethylene oxide condensate gave a relatively large quantity of rather stable foam.

The following examples in the opinion of the inventors represent preferred embodiments of the invention:

EXAMPLES 1 TO 3

The quantity of resin (so-called "deleterious resin") deposited on a rotating copper agitator was determined, using the quaternary ammonium methyl triethanolamine monomethyl sulfate resin control agent of example A, in comparison with the fatty alcohol-ethylene oxide adduct of example A. The procedure used was in accordance with C.H. Gustafsson, *Das Papier*, Volume 10, Pamphlet No. 13/14, page 266 (1954). The amounts of deleterious resin found on the copper surface for varying concentrations of these additives, together with talcum as a second comparison additive are shown in the following table:

TABLE I

| Example Number | Additive | Amount (percent by pulp weight) | Deleterious resin (mg. per 200g. of unbleached sulfite pulp) |
|---|---|---|---|
| Control | None | None | 150 |
| 1 | Quaternary ammonium methyl triethanolamine monomethyl sulfate according to Example A. | 0.05 | 124 |
| 2 | do | 0.10 | 70 |
| 3 | do | 0.20 | 69 |
| A1 | Fatty alcohol-ethylene oxide adduct according to Example A. | 0.05 | 115 |
| A2 | do | 0.10 | [1]65 |
| A3 | do | 0.20 | [1]53 |
| B1 | Talcum | 0.10 | 152 |
| B2 | do | 0.20 | 280 |

[1] Very troublesome foaming and sizing difficulties.

It is apparent from the results that the quaternary ammonium methyl triethanolamine monomethyl sulfate gives good resin control without giving rise to the troublesome foaming and sizing difficulties obtained with the fatty alcohol ethylene oxide adduct. The talcum appears to be worse than the control, with no additive whatsoever.

EXAMPLES 4 TO 7

Quaternary ammonium methyl triethanolamine monomethyl sulfate prepared in accordance with example A was used in this experiment. Its activity in controlling the quantity of deleterious resin was estimated by flotation. The flotation apparatus was a Hallimond tube provided with a glass filter at the bottom. Nitrogen gas was blown at a rate of 120 ml./minute through the overlying cellulose fiber suspension (100 ml., 1percent birch pulp) at a liquid temperature of 20° C.). The pH of the suspension was adjusted to 5 in one series of experiments, and to 8, in a second series of experiments. The resin which floated on the surface of the liquid was collected, separated, and weighed. The results are set forth in the following table:

TABLE II

| Example Number | Concentration of quaternary ammonium methyl triethanolamine monomethyl sulfate [1] | Floated resin (mg.) | |
|---|---|---|---|
| | | pH 5 | pH 8 |
| 4(a) | 0 | 45 | |
| 4(b) | 0 | | 20 |
| 5(a) | 10 | 38 | |
| 5(b) | 10 | | 16 |
| 6(a) | 25 | 31 | |
| 6(b) | 25 | | 13 |
| 7(a) | 50 | 22 | |
| 7(b) | 50 | | 9 |

[1] P.p.m. of the weight of fiber suspension.

It is apparent from the data that the quaternary ammonium methyl triethanolamine monomethyl sulfate successfully prevented the formation of deleterious resin both at a pH of 5 and at a pH of 8.

EXAMPLE 8

Using the same apparatus as set forth in examples 4 to 7, 4.50 p.p.m. of quaternary ammonium ethyl polyoxyethylene triethanolamine monoethyl sulfate (prepared by condensation of 10 moles of ethylene oxide per mole of triethanolamine and then quaternization of the polyoxyethylene triethanolamine with diethyl sulfate). Under the test conditions, at 20° C. and a pH of 5, the quantity of deleterious resin floated was reduced from 30 mg. without resin control agent to 17 mg. when the quaternary ammonium ethyl polyoxyethylene triethanolamine-monoethyl sulfate was present. At a pH of 8, the amount of deleterious resin floated was reduced from 11 mg. to 5 mg.

EXAMPLE 9

Using the same apparatus, and the procedure described in examples 4 to 7, 50 p.p.m. of quaternary ammonium methyl polyoxypropylene polyoxyethylene butylamine monomethyl sulfate (prepared by condensing 2 moles of propylene oxide with 1 mole of butylamine, immediately followed by condensation of 4 moles of ethylene oxide, with the resulting product, and then quaternizing by treatment with 1 mole of dimethyl sulfate) was added to 100 ml. of a 1 percent suspension of birch pulp. At 20° C. and a pH of 5, the amount of deleterious resin floated was reduced from 46 mg. to 26 mg., in the presence of the quaternary ammonium methyl polyoxypropylene polyoxyethylene butylamine monomethyl sulfate.

EXAMPLE 10

Offset paper was produced from a pulp mixture comprising 75 percent bleached sulfate pulp and 25 percent bleached sulfite pulp. Three percent alum, 1 percent resin adhesive, 5 percent beaten starch and 0.1 percent quaternary ammonium methyl triethanolamine monomethyl sulfate prepared according to example A were added to the pulp (all percentages are based on the weight of the paper). The pH of the suspension was 4.5, and the weight of the manufactured paper was 80 grams per square centimeter. The sizing effect was characterized by the determination of the Cobb-Dennison and surface-sizing values. The values obtained in a control test without the quaternary ammonium methyl triethanolamine monomethyl sulfate were 25.6 and 14, respectively. These values were not influenced by the addition of the quaternary ammonium methyl triethanolamine monomethyl sulfate, which shows that sizing was not deleteriously affected.

EXAMPLE 11

In a test carried out on a plant scale in a papermaking plant, 0.2 percent (based on the weight of the pulp) of a quaternary ammonium methyl triethanolamine monomethyl sulfate (prepared according to example A) was added to a cellulose paper pulp. This test was run in comparison with an addition of 1.5 percent talcum powder, which was normally used, under otherwise identical conditions. The percentage of resin deposit obtained on the Fourdrinier wire was reduced by 50 percent as compared to that obtained when using talcum powder. No foaming or sizing problems were evident.

EXAMPLE 12

In a test carried out on a plant scale in a papermaking plant, 0.2 percent (based on the weight of the pulp) of a quaternary ammonium trimethyl ethyl ammonium chloride was added to a cellulose paper pulp. This test was run in comparison with an addition of 1.5 percent talcum powder, which was normally used, under otherwise identical conditions. The percentage of resin deposit obtained on the Fourdrinier wire was reduced by 42 percent, as compared to that obtained when using talcum powder. No foaming or sizing problems were evident.

Having regard to the foregoing disclosure, the following is claimed as the inventive and patentable embodiments thereof.

1. An aqueous cellulose pulp suspension comprising cellulose pulp fibers dispersed in water, resin, and a water-soluble cationic resin control agent which is nonsurface-active according to the new method of de Noüy, the resin control agent being in an amount within the range from 0.005 to about 1 percent based on the weight of the cellulose pulp fibers to inhibit deposition of resin from the suspension, and comprising a nonsurface-active quaternary ammonium salt selected from the group consisting of quaternary ammonium lower alkyl salts, quaternary ammonium lower alkanol salts, and quaternary ammonium polyoxyalkylenealkanol salts wherein the polyoxyalkylenealkanol groups have a formula selected from the group consisting of $(C_2H_4O)_mH$, $(C_3H_6O)_p$ and $-(C_4H_8O)_qH$, where $m$ is an integer from one to ten, $p$ is an integer from one to five, and $q$ is an integer from one to two; and mixtures of two or more of such groups.

2. An aqueous cellulose pulp suspension according to claim 1 in which the quaternary ammonium salt has the formula:

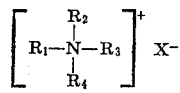

in which $R_1$, $R_2$, $R_3$ and $R_4$ are selected from the group consisting of lower alkyl; lower hydroxyalkyl; and polyoxyalkylene radicals terminating in a hydroxyl group, having from two to about 20 carbon atoms and having a formula selected from the group consisting of $(C_2H_4O)_mH$, $(C_3H_6O)_pH$ and $(C_4H_8O)_qH$, wherein $m$ is an integer from one to ten, $p$ is an integer from one to five, and $q$ is an integer from one to two; and mixtures of two or more of such groups; and X is an inorganic anion.

3. An aqueous pulp suspension according to claim 2 wherein three of the R radicals are saturated lower aliphatic hydrocarbon radicals.

4. An aqueous pulp suspension according to claim 2 wherein three of the R radicals are hydroxyalkyl radicals.

5. An aqueous pulp suspension according to claim 2 wherein three of the R radicals are hydroxyalkylene polyoxyalkylene radicals.

6. An aqueous pulp suspension according to claim 2 wherein X is selected from the group consisting of $HSO_4$, $CH_3SO_4$, Cl and Br.

7. An aqueous pulp suspension according to claim 2 wherein the quaternary ammonium salt is a quaternary methyl triethanolamine having the formula:

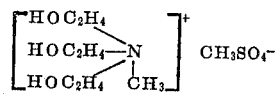

8. A process for the control of resin in aqueous cellulose pulp suspensions, which comprises incorporating in the suspension a resin control agent comprising a water-soluble nonsurface-active cationic quaternary ammonium salt selected from the group consisting of quaternary ammonium lower alkyl salts, quaternary ammonium lower alkanol salts, and quaternary ammonium polyoxyalkylenealkanol salts wherein the polyoxyalkylenealkanol groups have a formula selected from the group consisting of $(C_2H_4O)_mH$, $(C_3H_6O)_pH$ and $(C_4H_8O)_q$ wherein $m$ is an integer from one to ten, $p$ is an integer from one to five, and $q$ is an integer from one to two; and mixtures of two or more of such groups, in an amount within the range from 0.005 to about 1 percent based on the weight of the cellulose pulp fibers to inhibit deposition of resin from the suspension.

9. A process according to claim 8 in which the quaternary ammonium salt has the formula:

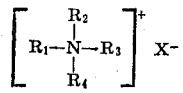

in which $R_1$, $R_2$, and $R_3$ and $R_4$ are selected from the group consisting of lower alkyl lower hydroxyalkyl; and polyoxyalkylene radicals terminating in a hdroxyl group having from two to about 20 carbon atoms, and having a formula selected from the group consisting of $(C_2H_4O)_m$, $(C_3H_6O)_pH$ and $(C_4H_8O)H$, wherein $m$ is an integer from one to ten, $p$ is an integer from one to five, and $q$ is an integer from one to two; and mixtures of two or more of such groups; and X is an inorganic anion.

10. A process according to claim 9 in which the quaternary ammonium salt is a quaternary methyl triethanolamine having the formula:

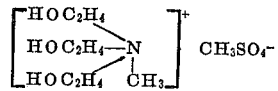

11. A process according to claim 9 wherein three of the R radicals are saturated lower aliphatic hydrocarbon radicals.

12. A process according to claim 9 wherein three of the R radicals are hydroxyalkyl radicals.

13. A process according to claim 9 wherein three of the R radicals are hydroxyalkylene polyoxyalkylene radicals.

14. A process according to claim 9 wherein X is selected from the group consisting of $HSO_4$, $CH_3SO_4$, Cl and Br.

* * * * *

PO-1050
(5/69)

UNITED STATES PATENT OFFICE
CERTIFICATE OF CORRECTION

Patent No. 3,619,351  Dated November 9, 1971

Inventor(s) Frans Adam Kolosh

It is certified that error appears in the above-identified patent and that said Letters Patent are hereby corrected as shown below:

| | | |
|---|---|---|
| Column 1, line 6 | : | "deposition or resin" should be --deposition of resin-- |
| Column 1, line 47 | : | "soaps of synthetic detergent" should be --soaps or synthetic detergents-- |
| Column 2, line 73 | : | "$(C_4H_8O)H$" should be --$C_4H_8O)_qH$-- |
| Column 4, line 5 | : | "mono-, de- or" should be --mono-, di- or-- |
| Column 4, line 17 | : | "ehtnaolamine" should be --ethanolamine-- |
| Column 5, Table B (second heading) | : | "Quaternary ammonium methyl tri- methyl tri- monomethyl sulfate" --Quaternary ammonium methyl tri- ethanolamine monomethyl sulfate-- |
| Column 5, lines 8 and 45 | : | "example" should be --Example-- |
| Column 6, lines 2, and 70 | : | "example" should be --Example-- |
| Column 6, lines 34 and 50 | : | "examples" should be --Examples-- |

3,619,351

(2)

| | | |
|---|---|---|
| Column 6, line 72 | : | "paper was 80 grams per square centimeter" should be --paper was 80 grams per square meter-- |
| Column 7, line 11 | : | "example" should be --Example-- |
| Column 7, line 35 | : | "to the new method" should be --to the method-- |
| Column 8, line 27 | : | "$(C_4H_8O)_q$" should be --$(C_4H_8O)_qH$-- |
| Column 8, line 41 | : | "lower alkyl lower hydroxyalkyl" should be --lower alkyl; lower hydroxyalkyl-- |
| Column 8, line 42 | : | "hdroxyl" should be --hydroxyl-- |
| Column 8, line 44 | : | "$(C_2H_4O)_m$" should be --$(C_2H_4O)_mH$-- |
| Column 8, line 45 | : | "$(C_4H_8O)H$" should be --$(C_4H_8O)_qH$-- |

Signed and sealed this 15th day of August 1972.

(SEAL)
Attest:

EDWARD M. FLETCHER, JR.
Attesting Officer

ROBERT GOTTSCHALK
Commissioner of Patents